(12) United States Patent
Whitcomb et al.

(10) Patent No.: US 9,095,903 B2
(45) Date of Patent: *Aug. 4, 2015

(54) NANOWIRE RING PREPARATION METHODS, COMPOSITIONS, AND ARTICLES

(71) Applicants: David R. Whitcomb, Woodbury, MN (US); Junping Zhang, Saint Paul, MN (US)

(72) Inventors: David R. Whitcomb, Woodbury, MN (US); Junping Zhang, Saint Paul, MN (US)

(73) Assignee: Carestream Health, Inc., Rochester, NY (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/710,491

(22) Filed: Dec. 11, 2012

(65) Prior Publication Data

US 2013/0186239 A1 Jul. 25, 2013

Related U.S. Application Data

(60) Provisional application No. 61/589,508, filed on Jan. 23, 2012.

(51) Int. Cl.
| | | |
|---|---|---|
| *B22F 9/24* | (2006.01) | |
| *B22F 9/20* | (2006.01) | |
| *B22F 1/00* | (2006.01) | |
| *C22C 5/06* | (2006.01) | |
| *B82Y 30/00* | (2011.01) | |

(52) U.S. Cl.
CPC ... *B22F 9/20* (2013.01); *B22F 1/00* (2013.01); *B22F 1/0025* (2013.01); *B22F 9/24* (2013.01); *B82Y 30/00* (2013.01); *C22C 5/06* (2013.01)

(58) Field of Classification Search
None
See application file for complete search history.

(56) References Cited

U.S. PATENT DOCUMENTS

| | | | |
|---|---|---|---|
| 7,922,787 B2 | 4/2011 | Wang et al. | |
| 8,815,150 B2 * | 8/2014 | Whitcomb et al. | 420/590 |
| 2008/0003130 A1 | 1/2008 | Xia et al. | |
| 2009/0311530 A1 | 12/2009 | Hirai et al. | |
| 2010/0279128 A1 * | 11/2010 | Lou et al. | 428/457 |
| 2011/0048170 A1 | 3/2011 | Bhatia et al. | |
| 2012/0034129 A1 * | 2/2012 | Suh et al. | 420/591 |

FOREIGN PATENT DOCUMENTS

| | | |
|---|---|---|
| CN | 101934377 | 1/2011 |
| CN | 102029400 | 4/2011 |
| JP | 2009-155674 | 7/2009 |

OTHER PUBLICATIONS

Hong-Mei Gong et al., Illuminating Dark Plasmons of Silver Nanoantenna Rings to Enhance Exciton—Plasmon Interactions, Adv. Funct. Mater., 2009, vol. 19, pp. 298-303.
Jinting Jiu et al., Preparation of Ag Nanorods With High Yield by Polyol Process, Materials Chemistry and Physics, 114, 2009, pp. 333-338.
YC Lu et al., Tailoring of Silver Wires and Their Performance as Transparent Conductive Coatings, Nanotechnology, vol. 21, 2010, 215707, pp. 1-6.
Srichandana Nandikonda, Microwave Assisted Synthesis of Silver Nanorods, M.S. Thesis, Auburn University, Aug. 2010, 59 pages.
Srichandana Nandikonda et al., Effects of salt selection on the rapid synthesis of silver nanowires, Abstract INOR-299, 240th ACS National Meeting, Boston, MA, Aug. 22-27, 2010, 1 page.

(Continued)

*Primary Examiner* — George Wyszomierski
(74) *Attorney, Agent, or Firm* — Reed L. Christiansen

(57) ABSTRACT

Methods and compositions are disclosed for preparation of both open and closed nanowire metal rings. Such rings may be used in conductive layers of electronic devices.

12 Claims, 12 Drawing Sheets

(56) References Cited

OTHER PUBLICATIONS

Younan Xia et al., Shape-Controlled Synthesis of Metal Nanocrystals: Simple Chemistry Meets Complex Physics?, Angew. Chem, Int. Ed., 2009, vol. 48, pp. 60-103.

Li Zhou et al., Crystal Structure and Optical Properties of Silver Nanorings, Applied Physics Letters 94, 2009, 153102, pp. 1-3.

International Search Report for International Application No. PCT/US2012/069034 mailed on Mar. 22, 2013, 4 pages.

\* cited by examiner

NANOWIRE RING PREPARATION METHODS, COMPOSITIONS, AND ARTICLES

CROSS REFERENCE TO RELATED APPLICATIONS

This is application claims priority to U.S. provisional patent application 61/589,508, filed Jan. 23, 2012, entitled NANOWIRE RING PREPARATION METHODS, COMPOSITIONS, AND ARTICLES, which is hereby incorporated by reference in its entirety.

BACKGROUND

The general preparation of silver nanowires (10-200 aspect ratio) is known. See, for example, Angew. Chem. Int. Ed. 2009, 48, 60, Y. Xia, Y. Xiong, B. Lim, S. E. Skrabalak, which is hereby incorporated by reference in its entirety. Such preparations typically employ $Fe^{2+}$ or $Cu^{2+}$ ions to "catalyze" the wire formation over other morphologies.

The metal ions used to catalyze wire formation are generally primarily reported to be provided as a metal halide salt, usually as a metal chloride, for example, $FeCl_2$ or $CuCl_2$. See, for example, J. Jiu, K. Murai, D. Kim, K. Kim, K. Suganuma, Mat. Chem. & Phys., 2009, 114, 333, which refers to NaCl, $CoCl_2$, $CuCl_2$, $NiCl_2$ and $ZnCl_2$; Japanese patent application publication JP2009155674, which describes $SnCl_4$; S. Nandikonda, "Microwave Assisted Synthesis of Silver Nanorods," M. S. Thesis, Auburn University, Aug. 9, 2010, which refers to NaCl, KCl, $MgCl_2$, $CaCl_2$, $MnCl_2$, $CuCl_2$, and $FeCl_3$; S. Nandikonda and E. W. Davis, "Effects of Salt Selection on the Rapid Synthesis of Silver Nanowires," Abstract INOR-299, 240th ACS National Meeting, Boston, Mass., Aug. 22-27, 2010, which discloses NaCl, KCl, $MgCl_2$, $CaCl_2$, $MnCl_2$, $CuCl_2$, $FeCl_3$, $Na_2S$, and NaI; Chinese patent application publication CN101934377, which discloses $Mn^{2+}$; Y. C. Lu, K. S. Chou, Nanotech., 2010, 21, 215707, which discloses $Pd^{2+}$; and Chinese patent application publication CN102029400, which discloses NaCl, $MnCl_2$, and $Na_2S$.

Preparation of silver nanowire rings in the presence of NaBr has been disclosed in L. Zhou, X-F Fu, L. Yu, X. Zhang, X. F. Yu, and Z-H Hau, App. Phys. Lett., 2009, 94, 153102 and H-M Gong, L. Zhou, X-R Su, S. Xiao, S-D Liu, and Q-Q Wang, Adv. Funct. Mater., 2009, 19, 298-303.

SUMMARY

At least a first embodiment provides methods comprising providing a first composition that does not comprise polyvinylpyrrolidone, the first composition comprising at least one bromide ion; introducing into the first composition at least one first reducible metal ion and at least one first protecting agent; and reducing the at least one first reducible metal ion to at least one first metal nanowire ring.

In some embodiments, the reduction is performed in the presence of at least one second metal ion comprising at least one element from IUPAC Group 14. Such a second metal ion may, for example, comprise at least one ion in its +2 oxidation state. $Sn^{2+}$ is an exemplary second metal ion.

In some cases, the first composition does not comprise any protecting agents.

In some embodiments, the at least one first protecting agent comprises polyvinylpyrrolidone, or it consists essentially of polyvinylpyrrolidone.

In such methods, the at least one first reducible metal ion may, for example, comprise at least one ion of an IUPAC Group 11 element, at least one coinage metal ion, or at least one silver ion.

Other embodiments provide the at least one first metal nanowire ring produced according to such methods. In some cases, such at least one first metal nanowire ring comprises at least one silver nanowire ring.

At least a second embodiment provides methods comprising providing at least one compound capable of forming at least one bromide ion, the compound comprising at least one first atom, at least one bromine atom bonded to the at least one first atom, and at least one carbon atom bonded to the at least one first atom; and reducing at least one reducible metal ion to at least one metal nanowire ring in the presence of at least one of the at least one compound or the at least one bromide ion, wherein the absolute value of the difference in electronegativities of the at least one first atom and the at least one bromine atom is greater than about 0.4 Pauling units and less than about 2.0 Pauling units.

In some embodiments, the at least one first atom comprises at least one of a boron atom, a nitrogen atom, a phosphorus atom, a silicon atom, a sulfur atom, a selenium atom, or a carbon atom. In some cases, the at least one first atom comprises at least one carbon atom.

The at least one compound may, in some cases, be capable of forming at least one carbocation, such as, for example, at least one secondary or tertiary carbocation, or at least one tertiary carbocation. Triphenylmethylbromide is an exemplary compound.

In such methods, the at least one first reducible metal ion may, for example, comprise at least one ion of an IUPAC Group 11 element, at least one coinage metal ion, or at least one silver ion.

Other embodiments provide the at least one first metal nanowire ring produced according to such methods. In some cases, such at least one first metal nanowire ring comprises at least one silver nanowire ring.

These embodiments and other variations and modifications may be better understood from the brief description of the drawings, description, exemplary embodiments, examples, figures, and claims that follow. Any embodiments provided are given only by way of illustrative example. Other desirable objectives and advantages inherently achieved may occur or become apparent to those skilled in the art. The invention is defined by the patented claims.

DESCRIPTION

Figure 1:
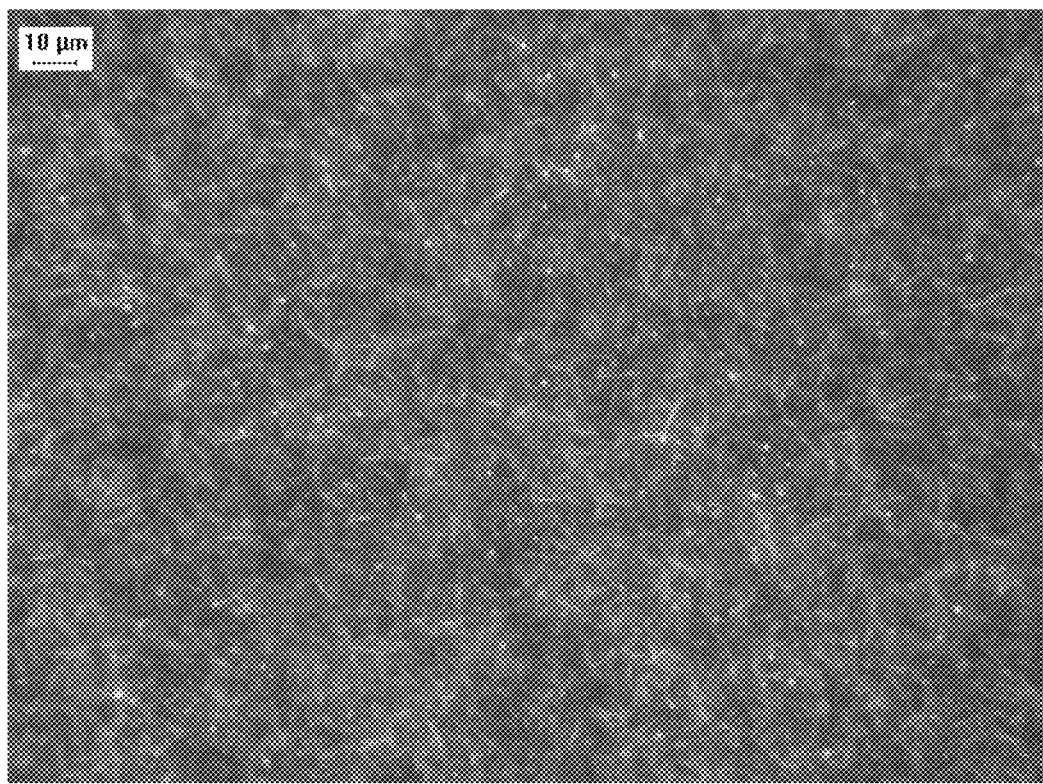
FIG. 1 shows an optical micrograph of the product of comparative Example 1.

All publications, patents, and patent documents referred to in this document are incorporated by reference herein in there entirety, as thought individually incorporated by reference.

U.S. provisional patent application 61/589,508, filed Jan. 23, 2012, entitled NANOWIRE RING PREPARATION METHODS, COMPOSITIONS, AND ARTICLES, is hereby incorporated by reference in its entirety.

Reducible Metal Ions, IUPAC Group 11 Ions, and Metal Nanowire Rings

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. An exemplary reducible metal ion is a silver cation. Such reducible metal ions may, in some cases, be provided as salts. Silver cations might, for example, be provided as silver nitrate.

In such embodiments, the at least one metal is that metal to which the at least one reducible metal ion is capable of being reduced. For example, silver would be the metal to which a silver cation would be capable of being reduced.

In some embodiments, the at least one metal is produced in the form of at least one metal nanowire ring. A nanowire ring may be characterized by having an average wire cross-sectional diameter of less than about 300 nm and an average ring diameter of greater than about 1 µm. The wire cross-section may be circular or elliptical. The ring may also be circular or elliptical. Such a nanowire ring may, for example, be planar or nearly-planar. It is expected that a collection of nanowire rings will be more efficient in making mutual electrical contact compared to a similar collection of randomly oriented linear nanowires.

In some cases, the metal nanowire ring may be a closed ring—one with no unconnected ends. In other cases, the metal nanowire ring may be an open arc, with two ends. The distance between the two ends of such an open metal nanowire ring is less than the diameter of a circular ring or less than the semi-major axis length (i.e., largest diameter) of an elliptical ring.

Metal nanowire rings may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

Preparation Methods

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Such a reduction may be carried out in a reaction mixture that may, for example, comprise one or more polyols, such as, for example, ethylene glycol (EG), propylene glycol, butanediol, glycerol, sugars, carbohydrates, and the like; one or more protecting agents, such as, for example, polyvinylpyrrolidinone (also known as polyvinylpyrrolidone or PVP), other polar polymers or copolymers, surfactants, acids, and the like; and one or more metal ions. These and other components may be used in such reaction mixtures, as is known in the art. The reduction may, for example, be carried out at one or more temperatures from about 80° C. to about 190° C.

Protecting Agents

Protecting agents are known. Protecting agents are also sometimes referred to by such terms as organic protective agents, protective agents, capping agent. U.S. Pat. No. 7,922,787 to Wang et al., which is hereby incorporated by reference in its entirety, provides an overview of such references.

For the purpose of this application, protecting agents are compounds that are capable of being absorbed onto a metallic surface, such as, for example, the surface of a metal nanoparticle, metal nanowire, or metal nanowire ring. When the metallic surface is that of silver, polyvinylpyrrolidone is commonly used as a protecting agent. However, other compounds are also capable of functioning as protecting agents. For example, other compounds that are capable of interacting electronically with metals, such as compounds containing atoms with one or more free electron pairs, may be able to function as protecting agents. Such atoms include oxygen, sulfur, and nitrogen; they may appear in a variety of functional groups within the protecting agent. Non-limiting examples of such compounds include polyvinyl alcohol, sodium dodecyl sulfate, laurylamine, hydroxypropyl cellulose, and copolymers containing vinyl pyrrolidone moieties. Other non-limiting examples of such compounds include copolymers containing ethylene and ethylene glycol moieties, copolymers containing ethylene and vinyl pyrrolidone moieties, copolymers containing ethylene and vinyl pyridine moieties, copolymers containing vinyl chloride and ethylene glycol moieties, copolymers containing vinyl chloride and vinyl pyrrolidone moieties, copolymers containing vinyl chloride and vinyl pyridine moieties, copolymers containing vinyl acetate and ethylene glycol moieties, copolymers containing vinyl acetate and vinyl pyrrolidone moieties, copolymer containing vinyl acetate and vinyl pyridine moieties, copolymers containing styrene and ethylene glycol moieties, copolymers containing styrene and vinyl pyrrolidone moieties, and copolymer containing styrene and vinyl pyridine moieties. These and other protecting agents will be understood by those skilled in the art.

Metal Ions from IUPAC Group 14

In some embodiments, the reduction of the reducible metal ion occurs in the presence of at least one second ion comprising at least one element from IUPAC Group 14, such as, for example, tin or germanium. Such a reduction may, in some cases, be carried out in the presence of such a second ion in its +2 oxidation state, such as, for example, $Sn^{2+}$ or $Ge^{2+}$.

Compounds Capable of Forming Bromide Ions

In some embodiments, the reduction of the reducible metal ion occurs in the presence of at least one compound capable of forming a bromide ion, where the compound comprises at least one first atom, at least one bromine atom bonded to the at least one first atom, and at least on carbon atom bonded to the at least one first atom, where the absolute value of the differences in electronegativities of the at least one first atom and the at least one bromine atom is greater than about 0.4 Pauling units and less than about 2.0 Pauling units. Such a bond between the at least one first atom and the at least one bromine atom can, for the purposes of this application, be referred to as a "polar covalent" bond.

In some embodiments, the at least one first atom comprises at least one of a boron atom, a nitrogen atom, a phosphorus atom, a silicon atom, a sulfur atom, a selenium atom, or a carbon atom. In some cases, the at least one first atom comprises at least one carbon atom.

The at least one compound may, in some cases, be capable of forming at least one carbocation, such as, for example, at least one secondary or tertiary carbocation, or at least one tertiary carbocation. Triphenylmethylbromide is an exemplary compound. Other non-limiting examples of the at least one compound are diethyldibromosilane, phenylphosphonic dibromide, and dibromophenylborane.

Other non-limiting examples of the at least one compound are compounds with the following chemical formulae: $R_xS\text{-}Br_y$, where $x+y=4$ and $y$ is non-zero; compounds $R_xBBr_y$, where $x+y=3$ and $y$ is not zero; borazines $R_xB_3N_3Br_y$, where $x+y=3$ and $y$ is non-zero; $R_xPBr_y$, where $x+y=3$ and $y$ is non-zero; $R_xPOBr_y$, where $x+y=3$ and $y$ is non-zero; acid halides RCOBr; $R_xCBr_y$, where $x+y=4$ and $y$ is non-zero; and $R_xH_zCBr_y$, where $x+y+z=4$, and $x$ and $y$ are non-zero. In these formulae, R represents an alkyl group, a substituted alkyl group, an aryl group, or a substituted aryl group. Substituted alkyl or aryl groups may comprise halogens, alkoxy moieties, amines, and the like.

In some cases, some of the bromine atoms in such compounds may optionally be replaced by other halogen atoms, such as one or more chlorine atoms, iodine atoms, or fluorine atoms.

Use of such compounds in the reduction of metal ions can allow the provision of bromide ions without also providing catalyst metal cations or nonprotic cations. In traditional nanowire synthesis methods, bromide ions are provided with catalyst metal cations or other nonprotic cations in stoichiometric rations governed by the identity of the bromine-bearing compounds. While not wishing to be bound by theory, it is believed that the presence of such cations can affect the morphology and dimensions of metal nanostructures that are formed.

Methods of Forming Metal Nanowire Rings

At least a first embodiment provides methods comprising providing a first composition that does not comprise polyvinylpyrrolidone, the first composition comprising at least one bromide ion; introducing into the first composition at least one first reducible metal ion and at least one first protecting agent; and reducing the at least one first reducible metal ion to at least one first metal nanowire ring.

In some embodiments, the reduction is performed in the presence of at least one second metal ion comprising at least one element from IUPAC Group 14. Such a second metal ion may, for example, comprise at least one ion in its +2 oxidation state. $Sn^{2+}$ is an exemplary second metal ion.

In some cases, the first composition does not comprise any protecting agents.

In some embodiments, the at least one first protecting agent comprises polyvinylpyrrolidone, or it consists essentially of polyvinylpyrrolidone.

In such methods, the at least one first reducible metal ion may, for example, comprise at least one ion of an IUPAC Group 11 element, at least one coinage metal ion, or at least one silver ion.

Other embodiments provide the at least one first metal nanowire ring produced according to such methods. In some cases, such at least one first metal nanowire ring comprises at least one silver nanowire ring.

At least a second embodiment provides methods comprising providing at least one compound capable of forming at least one bromide ion, the compound comprising at least one first atom, at least one bromine atom bonded to the at least one first atom, and at least one carbon atom bonded to the at least one first atom; and reducing at least one reducible metal ion to at least one metal nanowire ring in the presence of at least one of the at least one compound or the at least one bromide ion, wherein the absolute value of the difference in electronegativities of the at least one first atom and the at least one bromine atom is greater than about 0.4 Pauling units and less than about 2.0 Pauling units.

In some embodiments, the at least one first atom comprises at least one of a boron atom, a nitrogen atom, a phosphorus atom, a silicon atom, a sulfur atom, a selenium atom, or a carbon atom. In some cases, the at least one first atom comprises at least one carbon atom.

The at least one compound may, in some cases, be capable of forming at least one carbocation, such as, for example, at least one secondary or tertiary carbocation, or at least one tertiary carbocation. Triphenylmethylbromide is an exemplary compound.

In such methods, the at least one first reducible metal ion may, for example, comprise at least one ion of an IUPAC Group 11 element, at least one coinage metal ion, or at least one silver ion.

Other embodiments provide the at least one first metal nanowire ring produced according to such methods. In some cases, such at least one first metal nanowire ring comprises at least one silver nanowire ring.

EXEMPLARY EMBODIMENTS

U.S. provisional patent application 61/589,508, filed Jan. 23, 2012, entitled NANOWIRE RING PREPARATION METHODS, COMPOSITIONS, AND ARTICLES, which is hereby incorporated by reference in its entirety, disclosed the following 20 non-limiting exemplary embodiments:

A. A method comprising:

providing a first composition that does not comprise polyvinylpyrrolidone, the first composition comprising at least one bromide ion;

introducing into the first composition at least one first reducible metal ion and at least one first protecting agent; and reducing the at least one first reducible metal ion to at least one first metal nanowire ring.

B. The method according to embodiment A, wherein the reduction is performed in the presence of at least one second metal ion comprising at least one element from IUPAC Group 14.

C. The method according to embodiment B, wherein the at least one second metal ion comprises at least one ion in its +2 oxidation state.

D. The method according to embodiment C, wherein at least one second metal ion comprises at least one $Sn^{2+}$ ion.

E. The method according to embodiment A, wherein the first composition does not comprise any protecting agents.

F. The method according to embodiment A, wherein the at least one first protecting agent comprises polyvinylpyrrolidone.

G. The method according to embodiment A, wherein the at least one first protecting agent consists essentially of polyvinylpyrrolidone.

H. The method according to embodiment A, wherein the at least one first reducible metal ion comprises at least one ion of an IUPAC Group 11 element, at least one coinage metal ion, or at least one silver ion.

J. The at least one first metal nanowire ring produced according to the method of embodiment A.

K. The at least one first metal nanowire ring according to embodiment J, comprising at least one silver nanowire ring.

L. A method comprising:
providing at least one compound capable of forming at least one bromide ion, the compound comprising at least one first atom, at least one bromine atom bonded to the at least one first atom, and at least one carbon atom bonded to the at least one first atom; and
reducing at least one reducible metal ion to at least one metal nanowire ring in the presence of at least one of the at least one compound or the at least one bromide ion,
wherein the absolute value of the difference in electronegativities of the at least one first atom and the at least one bromine atom is greater than about 0.4 Pauling units and less than about 2.0 Pauling units.

M. The method according to embodiment L, wherein the at least one first atom comprises at least one of a boron atom, a nitrogen atom, a phosphorus atom, a silicon atom, a sulfur atom, a selenium atom, or a carbon atom.

N. The method according to embodiment L, wherein the at least one first atom comprises at least one carbon atom.

P. The method according to embodiment L, wherein the at least one compound is capable of forming at least one carbocation.

Q. The method according to embodiment L, wherein the at least one compound is capable of forming at least one secondary or tertiary carbocation.

R. The method according to embodiment L, wherein the at least one compound is capable of forming at least one tertiary carbocation.

S. The method according to embodiment L, wherein the at least one compound comprises triphenylmethylbromide.

T. The method according to embodiment L, wherein the at least one reducible metal ion comprises at least one ion of an IUPAC Group 11 element, at least one coinage metal ion, or at least one silver ion.

U. The at least one metal nanowire ring produced according the method of embodiment L.

VV. The at least one metal nanowire ring according to embodiment U, comprising at least one silver nanowire ring.

EXAMPLES

Example 1

Comparative

To a 500 mL reaction flask containing 280 mL EG, 1.6 g of a freshly prepared 11.5 mM $SnCl_4 \cdot 5H_2O$ solution in EG was added. The solution was stripped of at least some dissolved gases by bubbling $N_2$ into the solution for at least 2 hrs using a glass pipette at room temperature with mechanical stirring while at 100 rpm. (This operation will be referred to as "degassing" in the sequel.) Stock solutions of 0.25 M $AgNO_3$ in EG and 0.77 M PVP in EG were also degassed by bubbling $N_2$ into the solutions for 60 min. Two syringes were loaded with 20 mL each of the $AgNO_3$ and PVP solutions. The reaction mixture was heated to 145° C. under nitrogen and, after the reaction mixture was held 10 minutes at the set point temperature, $AgNO_3$ and PVP solutions were added at a constant rate over 25 minutes via a 12 gauge TEFLON® fluoropolymer syringe needle. The reaction mixture was held at 145° C. for 90 minutes, at which time a sample was taken for analysis by optical microscopy, and then allowed to cool to ambient temperature.

FIG. 1 is an optical micrograph of this product sample, showing only a few short silver nanowires and many silver nanoparticles.

Example 2

Comparative

To a 500 mL reaction flask containing 280 mL EG, 1.0 mL of 9.3 mM $SnCl_2$ in EG was added and degassed for 2 hrs by bubbling nitrogen into the solution using a glass pipette with mechanical stirring at 100 rpm. Stock solutions of 0.25 M $AgNO_3$ in EG and 0.77 M PVP in EG were also degassed by bubbling $N_2$ into the solutions for 60 min. Two syringes were loaded with 20 mL each of the $AgNO_3$ and PVP solutions. The reaction mixture was heated to 145° C. under nitrogen and, after the reaction mixture was held 10 minutes at the set point temperature, $AgNO_3$ and PVP solutions were added at a constant rate over 25 minutes via a 12 gauge TEFLON® fluoropolymer syringe needle. The reaction mixture was held at 145° C. for 90 minutes, at which time a sample was taken for analysis by optical microscopy, and then allowed to cool to ambient temperature.

Figure 2:
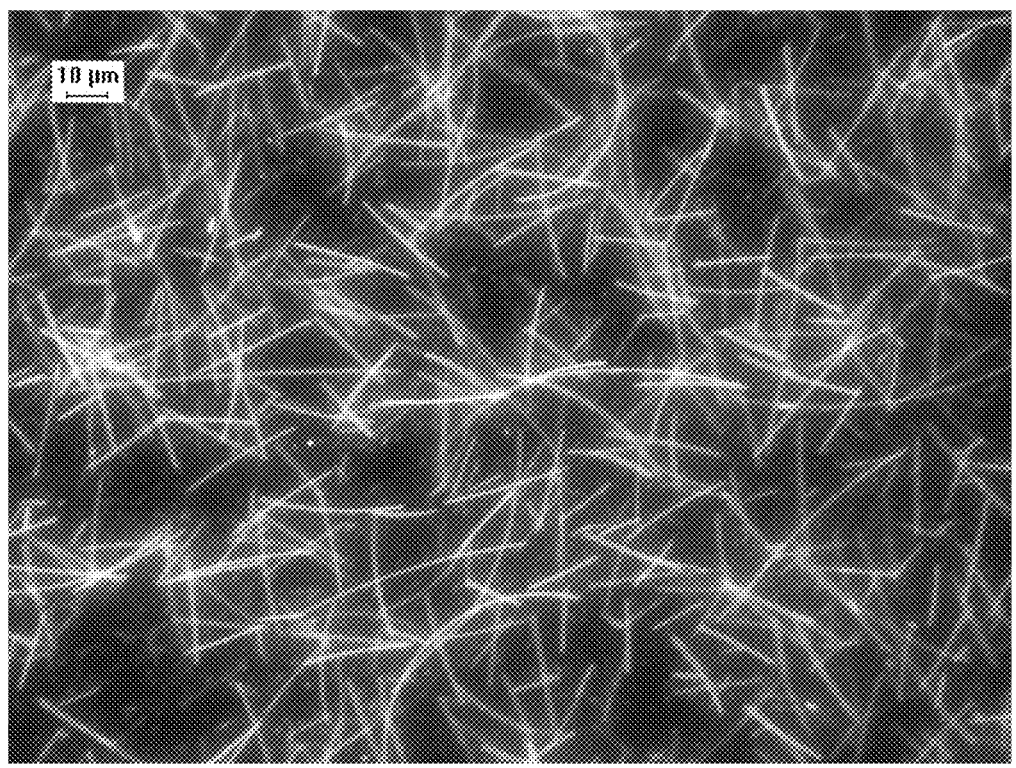
FIG. 2 shows an optical micrograph of the product of comparative Example 2.
Figure 3:
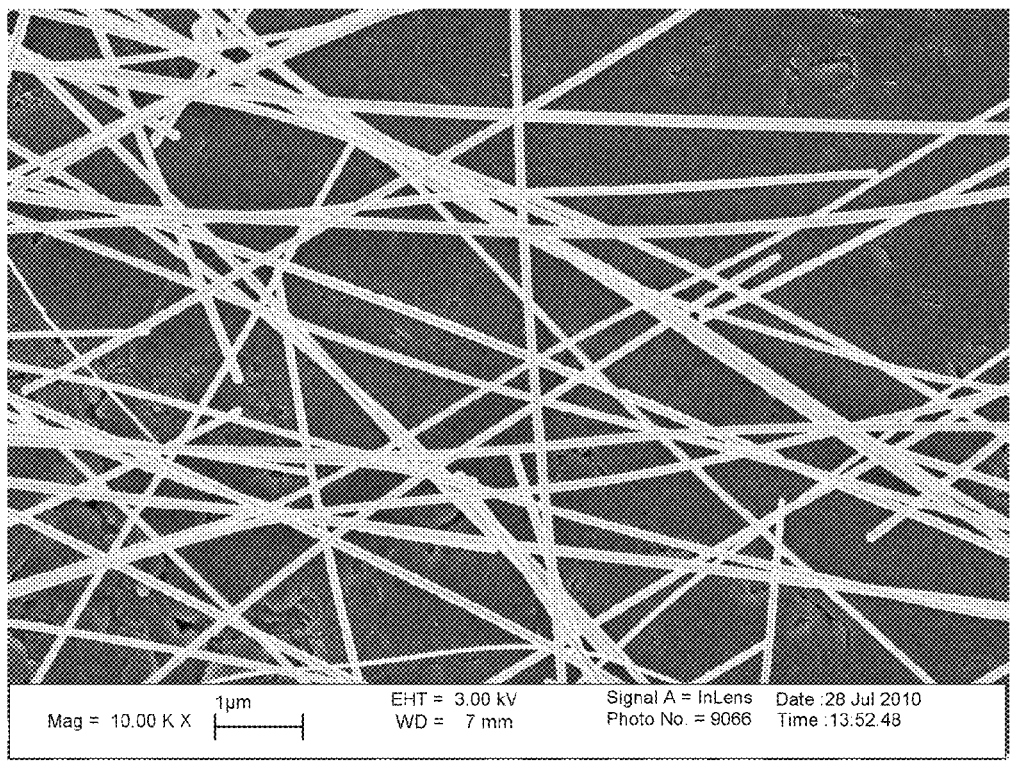
FIG. 3 shows a scanning electron micrograph of the product of comparative Example 2.

FIG. 2 is an optical micrograph of this product sample and FIG. 3 is a scanning electron micrograph of a purified product sample. Both show numerous nanowires with average diameter of 31±16 nm and average length of 8.7±2.7 μm, based on measurement of at least 100 wires. No nanowire rings were detected in either micrograph.

Example 3

Comparative

To a solution of 12 g of polyvinylpyrrolidone (PVP) (weight average molecular weight of 55,000 g/mol) in 150 ml of ethylene glycol (EG), 396.3 mg of silver nitrate was added at room temperature. The mixture was heated with stirring to 100-120° C. at a rate of one degree per minute. After silver seeds formed, the reaction was quenched by placing the flask containing the silver seed dispersion in an ice bath.

A 500 mL reaction flask containing 420 mL EG, 58.7 mg potassium bromide, and 9.96 g PVP was purged with nitrogen at room temperature using a TEFLON® fluoropolymer tube, while stirring at 100 rpm. A stock solution of 0.324 M silver nitrate in EG was also purged by bubbling nitrogen into the solution at room temperature. The reaction mixture was heated with stirring and purging to 170° C. Nitrogen purging of the reaction mixture was discontinued after 1 hr and nitrogen blanketing of the flask headspace commenced. The silver seed dispersion was added to the heated solution, followed immediately with addition of 62 mL of the 0.324 M silver nitrate solution through a TEFLON® fluoropolymer syringe pump over 45 minutes. The reaction mixture continued to be held at 170° C. for three hours, after which the reaction flask was cooled in an ice bath.

Figure 4:
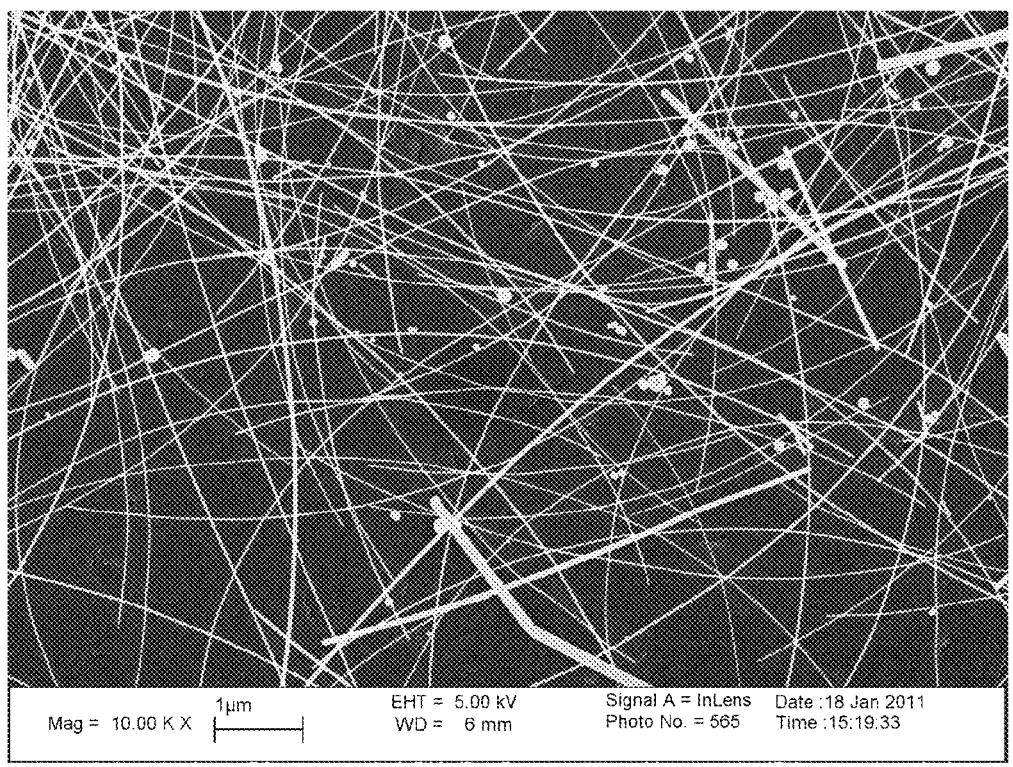
FIG. 4 shows a scanning electron micrograph of the product of comparative Example 3.
Figure 5:
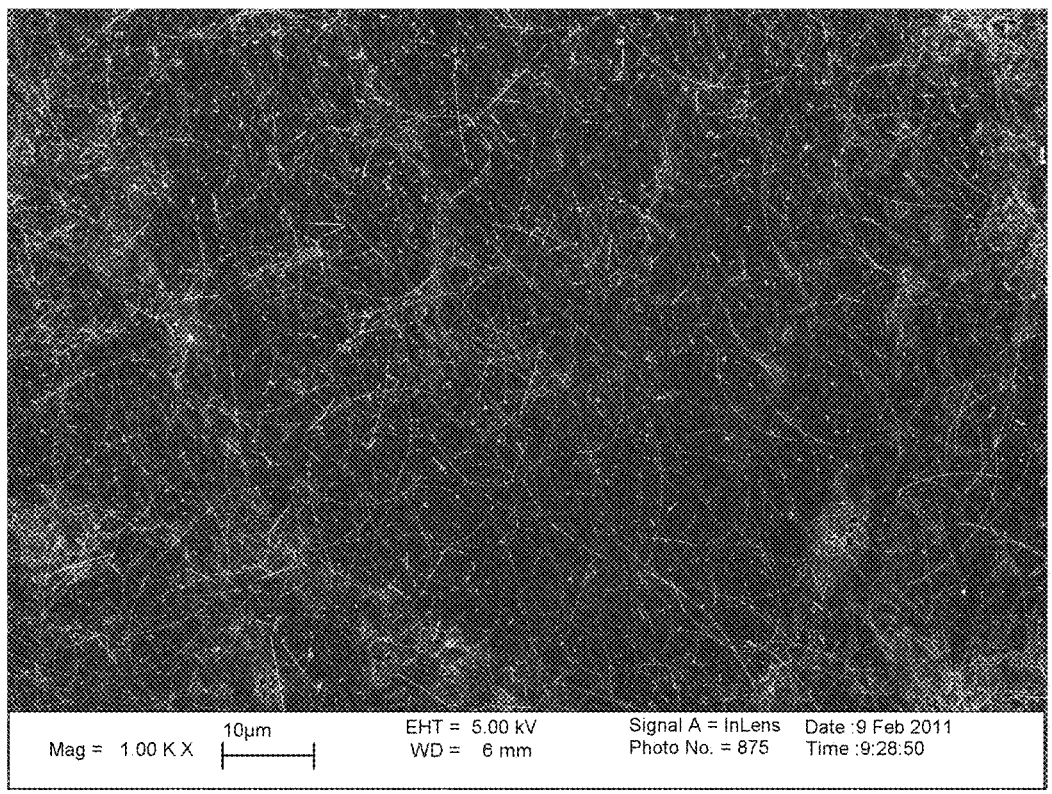
FIG. 5 shows a scanning electron micrograph of the product of comparative Example 3.

A scanning electron micrograph of the product, showing silver nanowires having an average diameter of 33±25 nm, is shown in FIG. 4. Another scanning electron micrograph of the product, showing silver nanowires having a length of 40 μm, is shown in FIG. 5. No nanowire rings were detected in either micrograph.

Example 4

Comparative

To a 500 mL reaction flask containing 300 mL ethylene glycol (EG), 10 g polyvinylpyrrolidinone (PVP) and 10 mg tin (II) bromide were added at room temperature. The flask was then heated to 160° C. while degassing by bubbling nitrogen through its contents. After 60 min, nitrogen bubbling was discontinued and the reaction flask headspace was instead blanketed with nitrogen. A solution of 3.3 g AgNO$_3$ in 60 mL EG, which had been degassed by bubbling nitrogen through it, was then added to the reaction flask at a constant rate 1.6 mL/min for 22 min via a syringe needle. After addition of the AgNO$_3$ solution, the flask was held at temperature for 66 min, after which the reaction was quenched by immersing the flask in ice.

Figure 6:
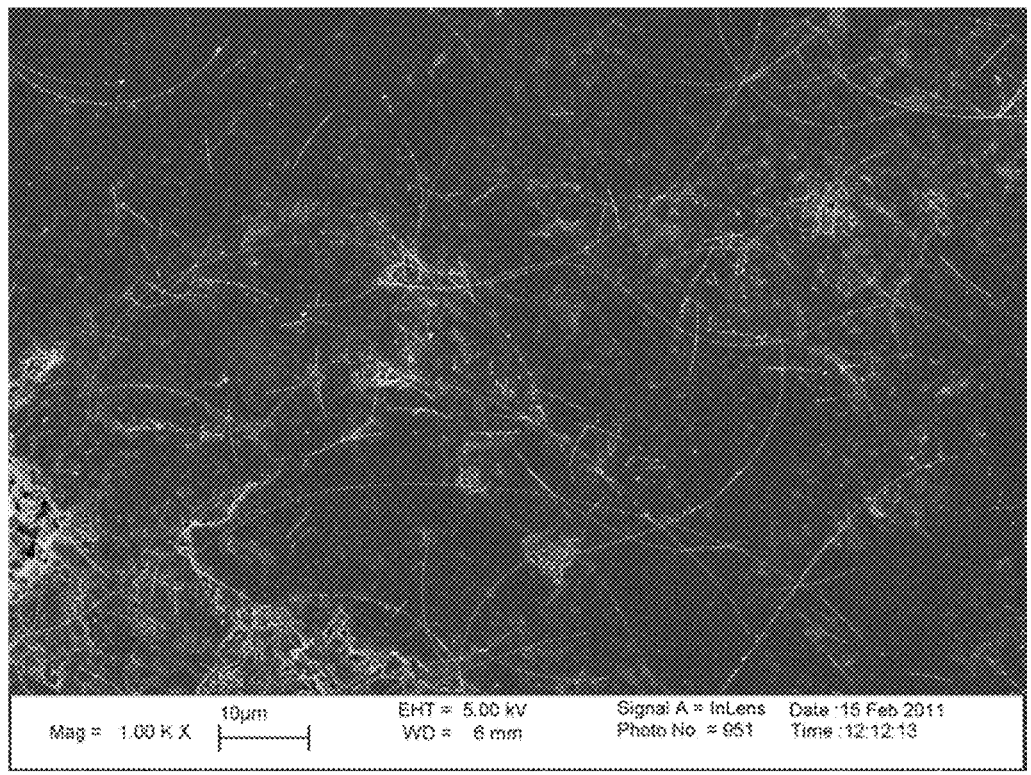
FIG. 6 shows a scanning electron micrograph of the product of comparative Example 4.

The reaction product was washed with acetone and isopropanol, then centrifuged to obtain the product silver nanowires. The average nanowire diameter was determined by scanning electron microscopy to be 49±17 nm. FIG. 6 shows a micrograph of the metal nanowire product, but no metal nanowire rings.

Example 5

Comparative

To a 500 mL reaction flask containing 300 mL EG, 12.0 g PVP, 62.5 mg potassium bromide, and 9.8 mg tin (II) chloride were added at room temperature. The flask was then heated to 170° C. while degassing by bubbling nitrogen through its contents. After 40 min, nitrogen bubbling was discontinued and the reaction flask headspace was instead blanketed with nitrogen. 260.1 mg silver chloride was then added to the reaction flask. A solution of 3.3 g AgNO$_3$ in 60 mL EG, which had been degassed by bubbling nitrogen through it, was then added to the reaction flask at a constant rate 1.6 mL/min for 45 min via a syringe needle. After addition of the AgNO$_3$ solution, the flask was held at temperature for 180 min, after which the reaction was quenched by immersing the flask in ice.

Figure 7:
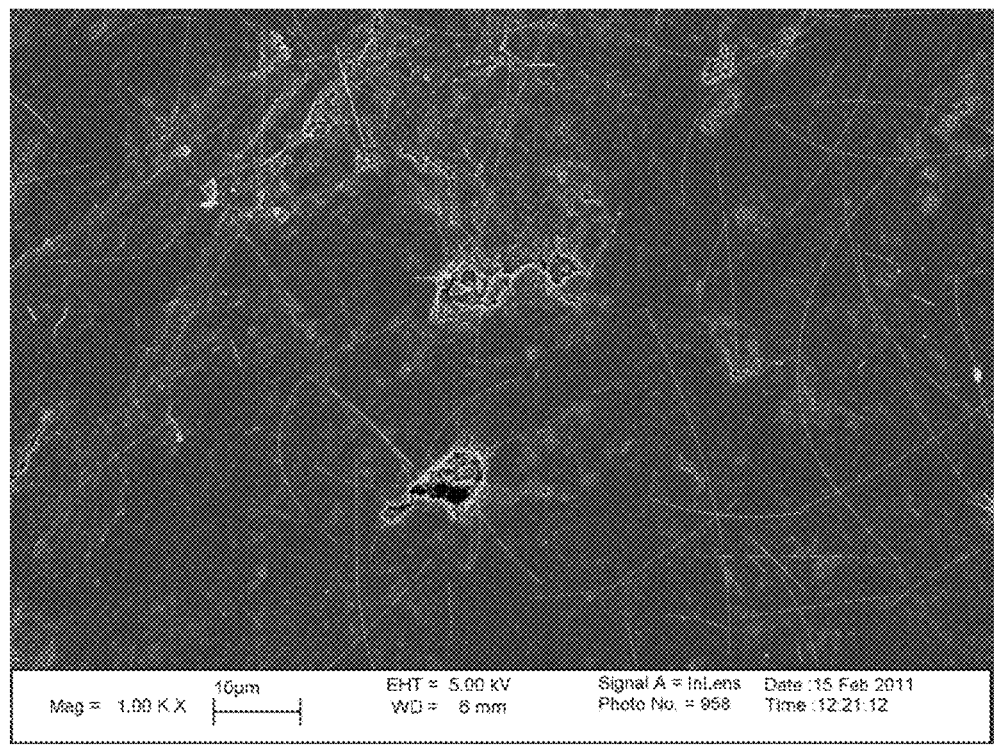
FIG. 7 shows a scanning electron micrograph of the product of comparative Example 5.

The reaction product was washed with acetone and isopropanol, then centrifuged to obtain the product silver nanowires. The average nanowire diameter was determined by scanning electron microscopy to be 43±24 nm. FIG. 7 shows a micrograph of the product, but no nanowire rings.

Example 6

A mixture of 6.2 mg SnBr$_2$ and 300 ml EG was heated from room temperature to 145° C. After the temperature stabilized, degassed solutions of 1.65 g AgNO3 in 30 ml EG and 5 g PVP in 30 ml EG were added using two syringe pumps each at a rate of 1.2 ml/min. The reaction mixture was held at 145° C. for 3 hrs and then quenched in an ice bath.

Figure 8:
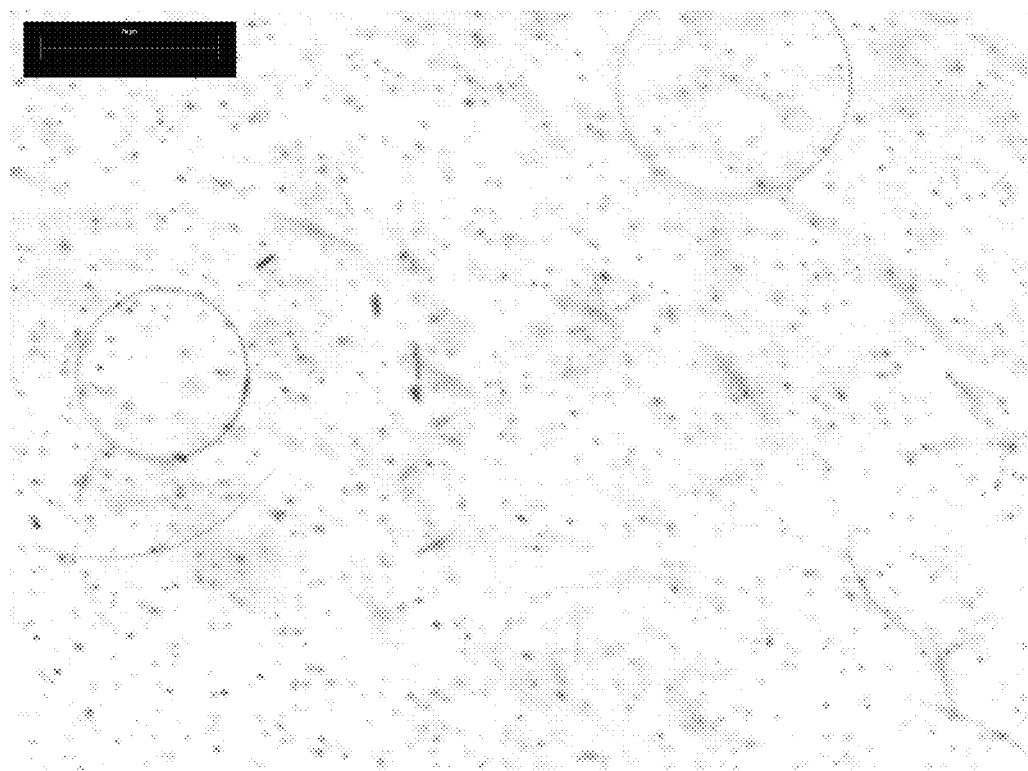
FIG. 8 shows an optical micrograph of the nanowire ring product of Example 6.
Figure 9:
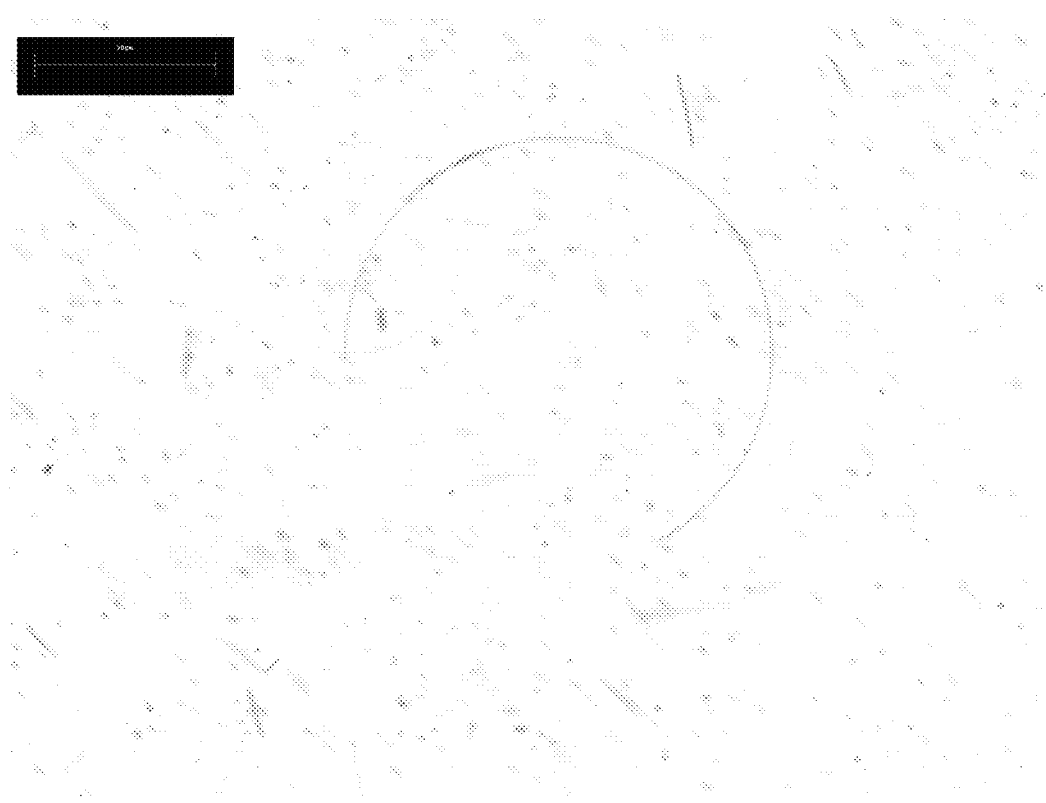
FIG. 9 shows an optical micrograph of the open nanowire ring product of Example 6.
Figure 10:
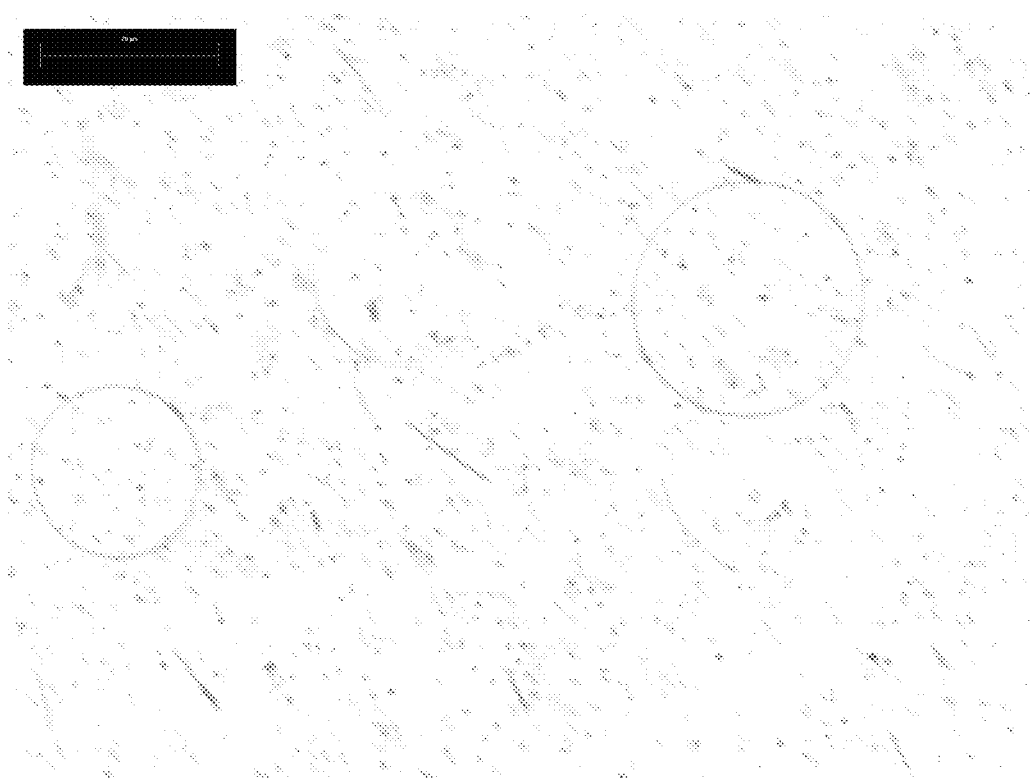
FIG. 10 shows an optical micrograph of the nanowire ring product of Example 6.
Figure 11:
FIG. 11 shows an optical micrograph of the nanowire ring product of Example 6.

FIGS. 8, 9, 10, and 11 are optical micrographs of the reaction product. FIGS. 8, 10, and 11 show closed silver nanowire rings and FIG. 9 shows an open silver nanowire ring.

Example 7

To a 500 mL reaction flask containing 280 mL ethylene glycol (EG), 11.3 g of 7.0 mM CuCl$_2$ in EG, 3.6 g of 0.13 M NaCl in EG, and 1.7 g of 0.25 M AgNO$_3$ in EG were added at room temperature. The flask was then degassing by bubbling nitrogen through its contents via a TEFLON® fluoropolymer tube. After 2 hrs, nitrogen bubbling was discontinued and the reaction flask headspace was instead blanketed with nitrogen. The reaction mixture was then heated to 145° C. Stock solutions of 0.25 M AgNO$_3$ in EG and 0.84 M PVP in EG were also degassed by bubbling N$_2$ through the solutions. Two 20 mL syringes were loaded with these solutions and added to the reaction mixture, each at the rate of 0.8 mL/min. At the end of the addition of these solutions, 36 mg of triphenylbromomethane in 1 mL EG was added to the reaction mixture. The reaction mixture was held at 145° C. for 90 min, and then the reaction mixture was heated to 160° C.

Figure 12:
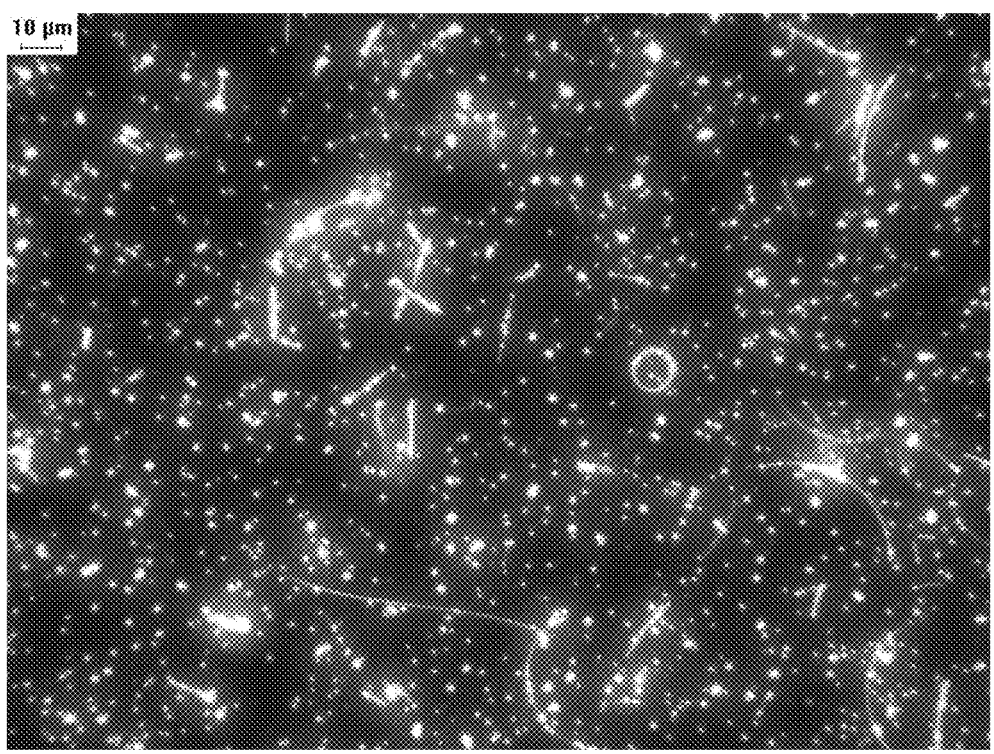
FIG. 12 shows an optical micrograph of the nanowire ring product of Example 7.

FIG. 12 shows an optical micrograph of a sample taken 30 min after the reaction mixture reacted 160° C. A silver nanowire ring is shown.

The invention has been described in detail with reference to particular embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. A method comprising:
    providing a first composition that does not comprise polyvinylpyrrolidone, the first composition comprising at least one bromide ion;
    introducing into the first composition at least one first reducible metal ion and at least one first protecting agent; and
    reducing the at least one first reducible metal ion to at least one first metal nanowire ring.

2. The method according to claim 1, wherein the reduction is performed in the presence of at least one second metal ion comprising at least one element from IUPAC Group 14.

3. The method according to claim 2, wherein the at least one second metal ion comprises at least one ion in its +2 oxidation state.

4. The method according to claim 3, wherein at least one second metal ion comprises at least one Sn$^{2+}$ ion.

5. The method according to claim 1, wherein the at least one first reducible metal ion comprises at least one ion of an IUPAC Group 11 element.

6. The method according to claim 5, wherein the at least one first reducible metal ion comprises at least one silver ion.

7. A method comprising:
    providing at least one compound capable of forming at least one bromide ion, the compound comprising at least one first atom, at least one bromine atom bonded to the at least one first atom, and at least one carbon atom bonded to the at least one first atom; and
    reducing at least one reducible metal ion to at least one metal nanowire ring in the presence of at least one of the at least one compound or the at least one bromide ion,
    wherein the absolute value of the difference in electronegativities of the at least one first atom and the at least one bromine atom is greater than about 0.4 Pauling units and less than about 2.0 Pauling units.

8. The method according to claim 7, wherein the at least one first atom comprises at least one of a boron atom, a nitrogen atom, a phosphorus atom, a silicon atom, a sulfur atom, a selenium atom, or a carbon atom.

9. The method according to claim 7, wherein the at least one first atom comprises at least one carbon atom.

10. The method according to claim 7, wherein the at least one compound comprises triphenylmethylbromide.

11. The method according to claim 7, wherein the at least one reducible metal ion comprises at least one ion of an IUPAC Group 11 element.

12. The method according to claim 11, wherein the at least one first reducible metal ion comprises at least one silver ion.

* * * * *